UNITED STATES PATENT OFFICE.

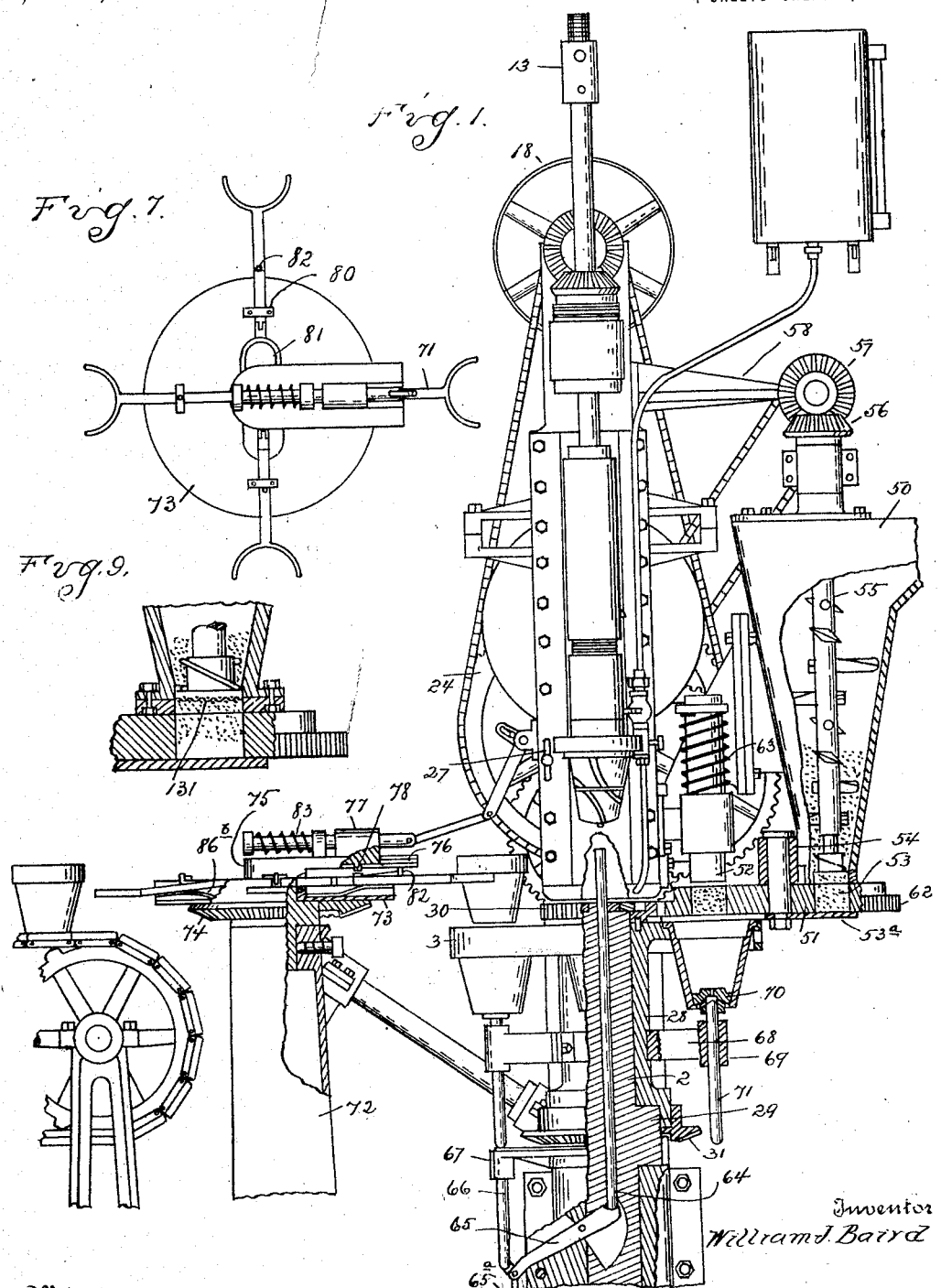

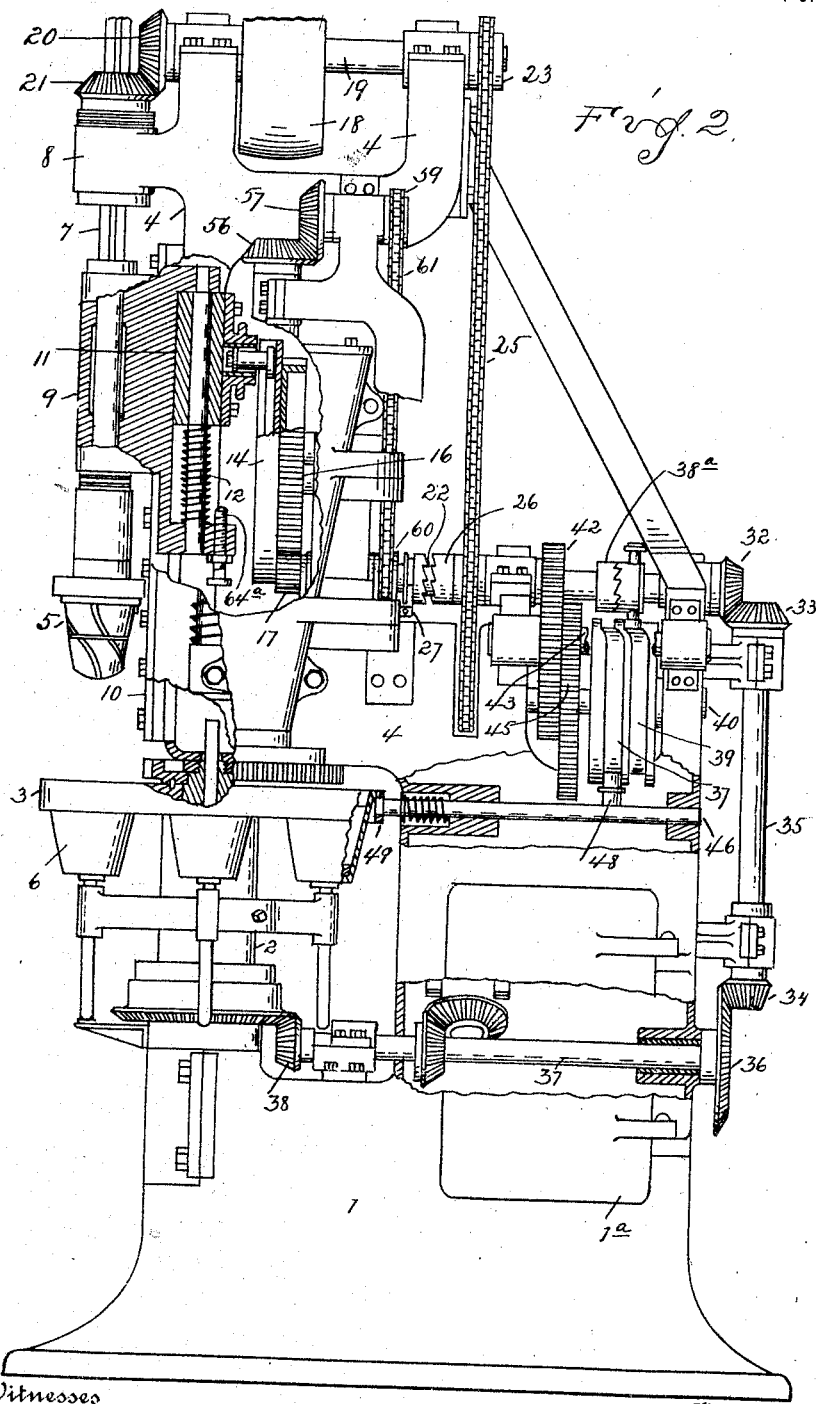

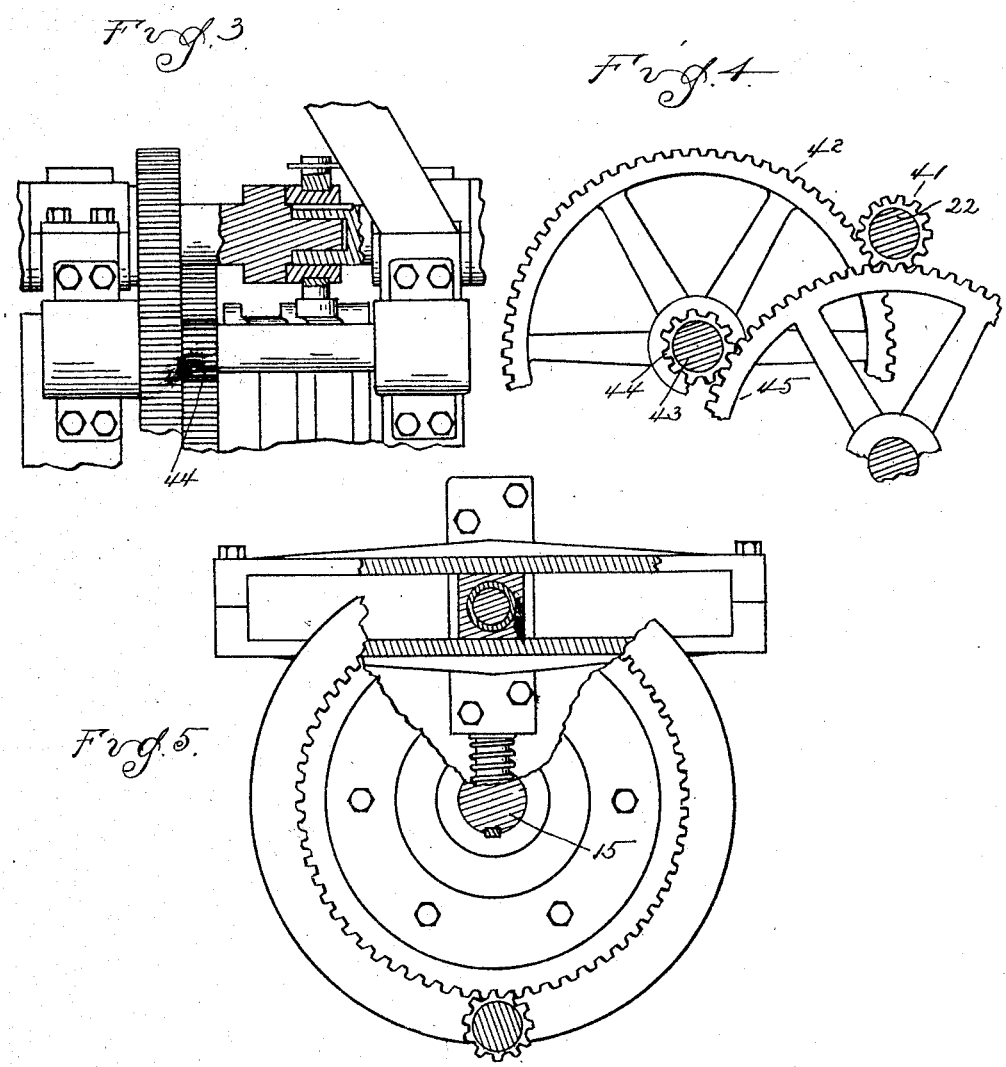

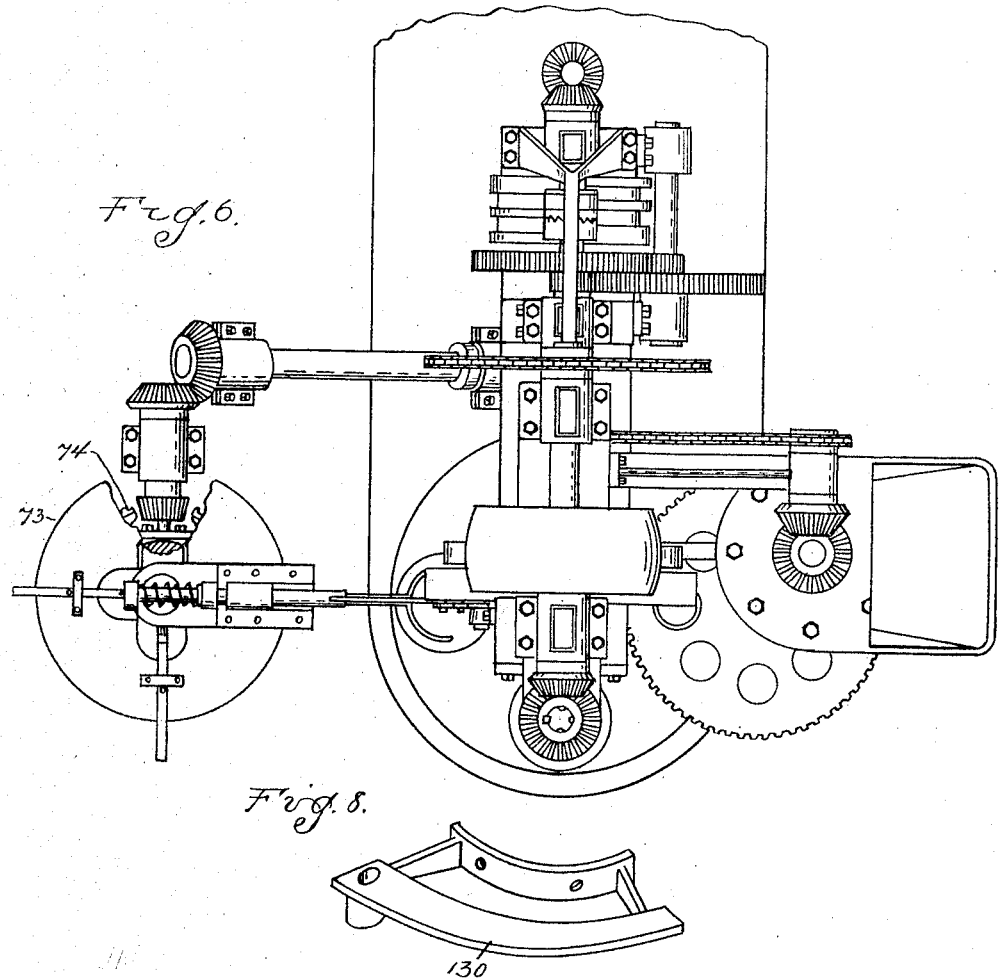

WILLIAM J. BAIRD, OF DETROIT, MICHIGAN.

MOLDING-MACHINE.

1,171,301.  Specification of Letters Patent.  Patented Feb. 8, 1916.

Original application filed July 9, 1910. Serial No. 571,198. Divided and this application filed April 5, 1915.
Serial No. 19,253

*To all whom it may concern:*

Be it known that I, WILLIAM J. BAIRD, a citizen of the United States of America, residing at Detroit, in the county of Wayne and State of Michigan, have invented certain new and useful Improvements in Molding-Machines, of which the following is a specification, reference being had therein to the accompanying drawings.

The invention relates generally to a machine for forming articles from plastic material, and it consists in the construction thereof, in the arrangement and combination of parts, and in various details of construction, as will be more fully hereinafter set forth.

For the purpose of illustration I have shown my invention as embodied in an automatic machine, especially designed for forming articles from clay, such for instance as flower pots.

In the drawings illustrating the invention,—Figure 1 is a sectional front elevation of the machine, the lower base portion being omitted; Fig. 2 is a sectional side elevation; Fig. 3 is an enlarged sectional side elevation of a portion of the mechanism for imparting an intermittent travel to the mold carrier; Fig. 4 is a sectional end elevation of the same mechanism; Fig. 5 is an enlarged sectional elevation of the mechanism for actuating the former; Fig. 6 is a plan view; Fig. 7 is a plan view of the transfer mechanism; Fig. 8 is a detail perspective view of the releasing device; and Fig. 9 is an enlarged sectional view, illustrating means for purifying the material.

In construction, the machine comprises a base section 1, made preferably hollow to contain a number of the working parts of the mechanism, and provided with a door 1ª through which access may be conveniently had to the interior parts. Rising from the base section is a standard 2, upon which is mounted for rotation in a horizontal plane a table 3, forming the mold carrier of the mechanism.

4 is a supporting frame, rising vertically from the base section, as shown.

5 is the spinner or former, mounted upon the support for vertical reciprocation and, rotation, and 6 are the molds arranged in a circular series on the periphery of the carrier 3 and adapted to register with the spinner.

In general, the machine includes a mechanism for reciprocating the former and rotating the same during the reciprocation; means for intermittently rotating the mold carrier to bring the molds successively into operative relation with the spinner or former; feed mechanism for automatically delivering material to the molds; and a delivery mechanism for delivering the finished articles; the several groups of mechanisms being timed to properly coöperate, as hereinafter more fully set forth.

Considering, first, the former-actuating means, the construction is as follows: 7 represents a spindle for the former journaled in a vertical bearing 8 on the supporting frame 4, and extending through and held against endwise movement within a sliding head 9. The head is mounted for vertical reciprocation in a guide 10, and is operated by a crosshead 11 having a limited vertical play within the head opposed by a cushion spring 12. An adjustable collar 13 on the former spindle determines the extent of relative movement of the crosshead. Motion is imparted to the crosshead by a disk crank 14 journaled on a stub-shaft 15 (Fig. 5) actuated by a gear 16 carried by the crank and a driven pinion 17 meshing with the gear. This pinion is driven, and the spindle 7 and former rotated by a driving mechanism comprising a main drive pulley 18 upon a shaft 19 journaled in the top of the supporting frame 4; bevel gears 20 and 21, the latter being splined upon the spindle; a driven shaft 22 carrying the pinion 17; sprocket gears 23 and 24 upon the driving and driven shafts and respectively fixed and loose thereon, and a sprocket chain 25 connecting the gears. A suitable clutch, as 26, is splined on the shaft 22 for engagement with the sprocket 24. A lever 27 projecting outwardly beyond the machine front controls the clutch and governs the operation of the machine.

The preferable construction of mechanism controlling the operation of the mold carrier includes a locking means for positively holding the carrier against movement during the rest intervals to permit not only of the proper coöperation of the former and mold, but the deposit within a complementary mold of a measured quantity of material to be worked, and the delivery from a third mold of a finished article.

The carrier, as shown in Fig. 1, is formed with a sleeve 28 encircling the standard 2, and seats upon a shoulder 29 thereon. At its upper end, the sleeve carries a gear 30, and at the lower end a bevel gear 31 to which rotary motion is transmitted from the driven shaft 22 through a gear train made up of bevel pinion 32 upon said shaft, similar pinions 33 and 34 upon a shaft 35, a bevel gear 36 on the horizontal shaft 37, and a pinion 38 meshing with the bevel gear upon the sleeve 28.

The intermittent movement of the carrier is effected through the agency of a clutch 38$^a$ upon the shaft 22, and a cam 39 controlling the clutch arranged upon a stub shaft 40 driven by a gear train connecting with the shaft 22. This train, shown more clearly in Figs. 4 and 6, includes a pinion 41 upon the latter shaft, a gear 42 upon a stub shaft 43, a gear pinion 44 upon said stub shaft, and a gear 45 fixed upon the cam shaft 40 and meshing with the pinion 44. As shown in Fig. 3, shaft 22 is broken near its outer end, and the extremity carrying the pinion 32 is connected to and is disconnected from the main section through the clutch. The cam is driven continuously, and is so fashioned as to cause an intermittent operation of the clutch, and the desired step-by-step movement of the carrier, the molds being brought to rest successively under the rotating former.

To lock the carrier during the rest intervals, I employ a spring-pressed locking bar 46 journaled in bearings in the supporting frame immediately adjacent the carrier, and a cam 47 similar to and adjoining the cam 39, controlling through a stud 48 its operation. During each interval of rest, the bar is automatically projected within one of a series of recesses, as 49, formed within the carrier periphery, thus holding the carrier absolutely stationary, while the feeding and forming is being effected. Upon the expiration of the rest period, the bar is automatically withdrawn by its cam, leaving the carrier free to be again positively rotated. This mechanism comprises in the preferred form a hopper 50 for the material that is to be supplied to the molds, and transferring means, in the form of an apertured disk 51 adapted to carry the material directly to the molds, and a spring-pressed ejector 52 for forcing the material from the disk apertures within the molds. The disk has formed in its peripheral portion a series of apertures or openings, as 53, corresponding to twice the number of the molds, and is pivoted in a horizontal plane above and to one side of the carrier 3 to discharge within the central portions of the molds. A stationary plate 53$^a$ beneath the disk and alining with the discharge end of the hopper permits the proper filling of the disk apertures with the material to be effected. The disk is supported on a bracket 54, and the bracket on the hopper, which in turn is rigidly attached to the supporting frame 4. The hopper is formed with a tapered discharge end to fit the opening in the disk, and extends in immediate proximity to the upper face of the disk, as shown.

55 is a feed screw within the hopper, having a drive connection with the driver shaft 22 through a bevel pinion 56 upon the upper end of the screw, a pinion 57 mounted on a bracket arm 58, sprocket gears 59 and 60 connected respectively to the gear 57 and the shaft 22, and a sprocket chain 61 connecting the gears.

The feeding disk described is rotated by means of a gear 62 thereon of twice the diameter and meshing with the gear 30 upon the rotary sleeve 28.

The ejector is in the form of a plunger mounted for reciprocation above the mold series and the apertures in the feeding disk. The parts are so arranged and proportioned that upon the descent of the former or spinner its crosshead 11 engages the ejector, causing the latter to force the material from the alining aperture in the feeding disk within the mold therebeneath. Upon the return upward movement of the former, the ejector spring 63 restores the ejector to its initial position.

The delivery mechanism in the particular type of machine illustrated comprises mechanism for disengaging the finished article from the mold, and means for automatically transferring the article from the machine, to preferably a suitable conveyer. In detail, the construction is as follows: Mounted centrally within the standard 2 is a rod 64, adapted to be engaged at its upper end by an adjustable stop 64$^a$ carried by the reciprocating former. At its lower end, this rod engages the lever 65, which in turn is connected to an ejector rod 66 mounted for reciprocation within a stationary bearing 67. 68 is a spider clamped upon the sleeve 28, and 69 are vertical guides carried at the extremities of the spider arms. Each mold is provided with a vertically shiftable base plate 70, and fixed to and depending from this plate is a guide rod 71 that engages the guide in the spider arm therebelow. Opposite the stationary bearing 67 is a standard 72 carrying at its upper end a centrally apertured table 73 mounted upon the standard for rotary movement. 74 is a bevel gear carried upon the under face of the table, and 75 is a stationary member projecting from the standard upwardly through the opening in the table. 76 is a guide rigidly secured to the stationary member described, and projecting in the direction of the stationary bearing 67, and 77 is a block sliding within the guide carrying upon its under face a projection or lug 78. 79 represents forked arms arranged upon the table in pairs, the arms in each pair alining and the pairs extending in right angular relation. A guide 80 upon the table is provided for each arm, and the arms in each pair are united by a yoke member 81 that straddles the central member 75 and has a hinge connection with each arm, permitting a vertical rocking movement for a purpose hereinafter set forth. Each of the arms described carries near its forked end a vertical projection 82 adapted to be engaged by the depending lug 78 on the sliding block. The block in turn is connected to a rod 83 extending horizontally through a bearing 84 and provided with a spring 85 between said bearing and a suitable head on the rod end. The free end of the rod described is connected to a bell-crank lever 86, fulcrumed upon the upright frame of the machine in the path of the reciprocating crosshead 11. 86 is an incline on each arm, adapted to pass beneath the guide 80, and 86$^b$ is a spring arm support. The table 73 is driven by a gear train from the shaft 37. 87 is a bevel gear on said shaft, which meshes with a corresponding gear 88 upon the shaft 89 extending diagonally from the base section of the machine to and having a suitable bearing upon the standard 72. At the upper end of this shaft is a bevel pinion 90 (Fig. 6), which meshes with a pinion 91 on a stub shaft 92 carrying a pinion 93 on its inner end, which engages the bevel gear upon the lower face of the table 73. An endless carrier of any suitable type is preferably employed to receive the finished article.

In operation, the main drive shaft 19 of the machine being rotated, motion is transmitted simultaneously to the feed and delivery mechanisms, and the former, the latter being continuously reciprocated and rotated during its reciprocation. As the former descends to operate within the registering mold, the finished article within the advanced mold is projected upwardly therefrom in a position for transfer to the carrier. The material is deposited within the mold next to aline with the former, and subsequently the transfer arm is moved inwardly into engagement with the raised article. During these movements the mold carrier is held stationary by its automatic lock, and the filling of the aperture in the feed disk alining with the hopper is effected. The downward pressure the former exerts upon the material to be worked is gradually increased through the agency of the spring 12 until the crosshead is at the limit of its descent. During this period the rotation of the former spreads the material until it conforms to the shaft of the mold, a limited amount of lubricant having been admitted to facilitate the spreading of the material. Upon the ascent of the former, after the fashioning of the article has been effected, the ejector 52 is immediately restored to its initial position, and simultaneously therewith the arm supporting the finished article is retracted by its spring 83, and the mold plate descends to its operative position within the mold by means of a weight 65$^a$. As the gear trains operate, the mold carrier is unlocked, and it and the feeding disk partially rotated, bringing another mold with material therein into alinement with the former, and an empty mold beneath the filled aperture of the feed disk. At the same time, the table 73 rotates, in this instance a quarter revolution, transferring the finished article half way to the carrier. The operation described is repeated, and the arm of the transfer mechanism carrying the finished article moved another quarter revolution, bringing the article over the carrier or conveyer but out of contact therewith. Upon the next descent of the former, the pair of arms alining in the direction of the mold carrier are shifted through the agency of the projection 78 and the pin or stud 82 upon the arm. During the movement of the arms in the direction of the mold carrier, the arm carrying the finished article is depressed, by reason of the incline or cam thereon passing beneath its guide 80. Thus, the finished article is deposited upon the carrier, and the complementary arm properly engages the article disengaged from the mold. This operation is repeated continuously as long as the machine is in operation, a finished vessel being deposited upon the carrier upon every quarter revolution of the table 73.

In the practical operation of the machine, I have found that a sudden ejection of the article just formed is detrimental in that it has a tendency to collapse the vessel. I have therefore provided means in the machine described for effecting a slight gradual ejection or releasement of the article within the mold before it is finally delivered therefrom in condition to be carried away by the transfer mechanism. The means preferably employed consist of an incline or cam 130 arranged beneath the series of molds in a position to be traveled over by the base plate rods or stems 71, the pitch of the incline being very slight so as to merely free the sides of the vessel from contact with the mold. The parts are so proportioned that this separation continues gradually until the mold sets temporarily in a position for the ejectment of the article, at which time the base plate rod or stem passes out of contact with the cam.

To obtain the best results in the commercial manufacture of plastic articles, I find it expedient to purify the plastic material by removing therefrom any and all foreign matter. To accomplish this, a screen of proper mesh 131 is preferably applied to the discharge end of the hopper, as shown in Fig. 19. Through this screen the material from the hopper is forced by the stirring and feeding mechanism therein, and all foreign matter is retained.

What I claim as my invention is:—

1. In an automatic machine for shaping plastic material, the combination with a movable mold carrier, provided with a series of molds, an ejector for each of said molds, means for intermittently shifting the mold carrier, a movable charge carrier, means for feeding material to said charge carrier, a plunger for delivering a charge of material from said charge carrier to one of the molds of said mold carrier, a rotary former adapted to coöperate with the molds of said mold carrier, means for reciprocating the rotary former to move the same into one of the molds of the mold carrier during the rest period thereof, and means for simultaneously elevating the ejector of another of said molds and actuating the plunger of said charge devices to fill another of said molds.

2. In an automatic machine for shaping plastic material, the combination with a series of molds adapted for movement in a horizontal plane, means for feeding a measured charge of material to said molds, comprising a traveling charge carrier adapted to overlie said mold and to traverse a portion thereof, means for feeding material into said charge carrier, a former adapted to coöperate successively with each of said molds, means for reciprocating said former to cause it to enter one of the molds, and means for simultaneously forcing a charge of material from said traveling carrier into another of said molds.

3. In an automatic machine for shaping plastic material, the combination with a traveling carrier, of a series of molds thereon, a rotary feed table overlying the mold carrier, said feed table being provided with a series of uniform pockets adapted to successively register with the molds of the mold carrier, a fixed hopper adapted to deliver material to said feed table, and a rotary former positioned for coöperation with the charged molds.

4. In an automatic machine for shaping plastic material, the combination with a rotary carrier, of a plurality of molds thereon, a rotary disk having a series of apertures extending therethrough, pivoted for movement in a plane above the molds for the successive registration of its apertures with the molds, means for charging the disk openings with plastic material, a plunger positioned for operation at the point of registration of a disk opening with a mold, a rotary and reciprocatory former, and means controlled by the reciprocatory movement of the former for intermittently operating the plunger.

5. In an automatic machine for shaping plastic material, the combination with a traveling carrier, of a series of molds thereon, a rotary feed table overlying the mold carrier, said feed table being provided with a series of uniform pockets adapted to successively register with the molds of the mold carrier, a fixed hopper adapted to deliver material to said feed table, a rotary former positioned for coöperation with the charged molds, mechanism for intermittently and simultaneously operating the mold carrier, and the feed table, and automatic means for locking the mold carrier, and feed table against relative movement during the rest intervals.

6. In an automatic machine for shaping plastic material, the combination with an intermittently operating marginally apertured charge carrier, of means for filling the openings of the charge carrier with plastic material, an ejector positioned to register with the filled openings successively, a series of molds traveling intermittently in a horizontal plane beneath the ejector and charge carrier, a rotary and reciprocatory former, and an ejector operating member reciprocating with the former.

7. In an automatic machine for forming plastic material, a rotary mold carrier provided with a series of molds, a former adapted to successively coöperate with the molds of said mold carrier, a charge carrier comprising a rotary member overlying said mold carrier and having a plurality of openings extending therethrough adapted to successively register with the molds of the mold carrier, a stationary feed hopper adapted to deliver material to the carrier, means for intermittently rotating the mold carrier and charge carrier, means for locking said carriers against rotation during the rest periods thereof, means for reciprocating the former to cause it to enter one of the molds of the mold carrier during the rest period thereof, and means for forcing a charge from the charge carrier into another of the molds of the mold carrier during the rest period thereof.

In testimony whereof I affix my signature in presence of two witnesses.

WILLIAM J. BAIRD.

Witnesses:
WM. J. BELKNAP,
JAMES P. BARRY.